UNITED STATES PATENT OFFICE.

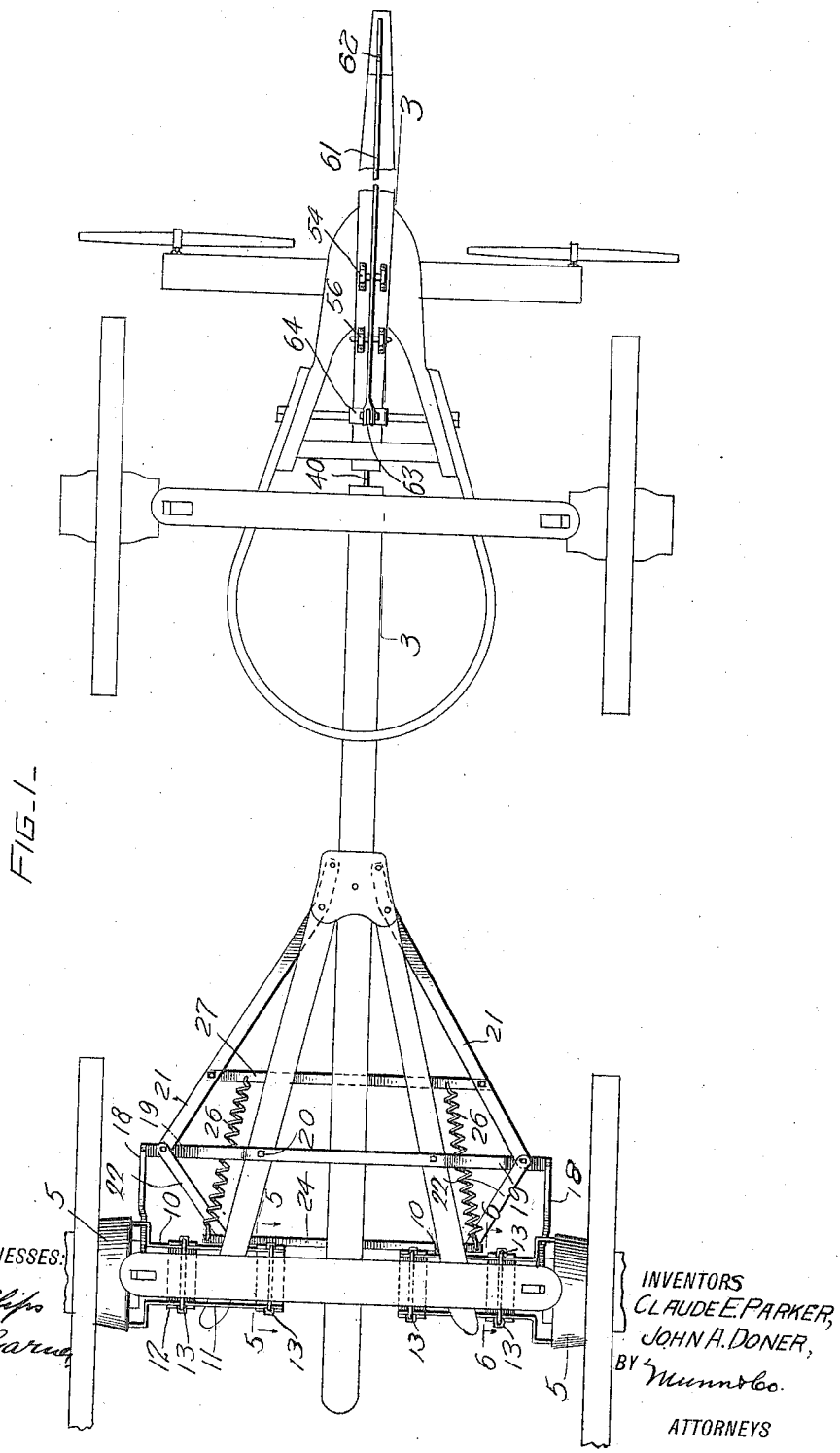

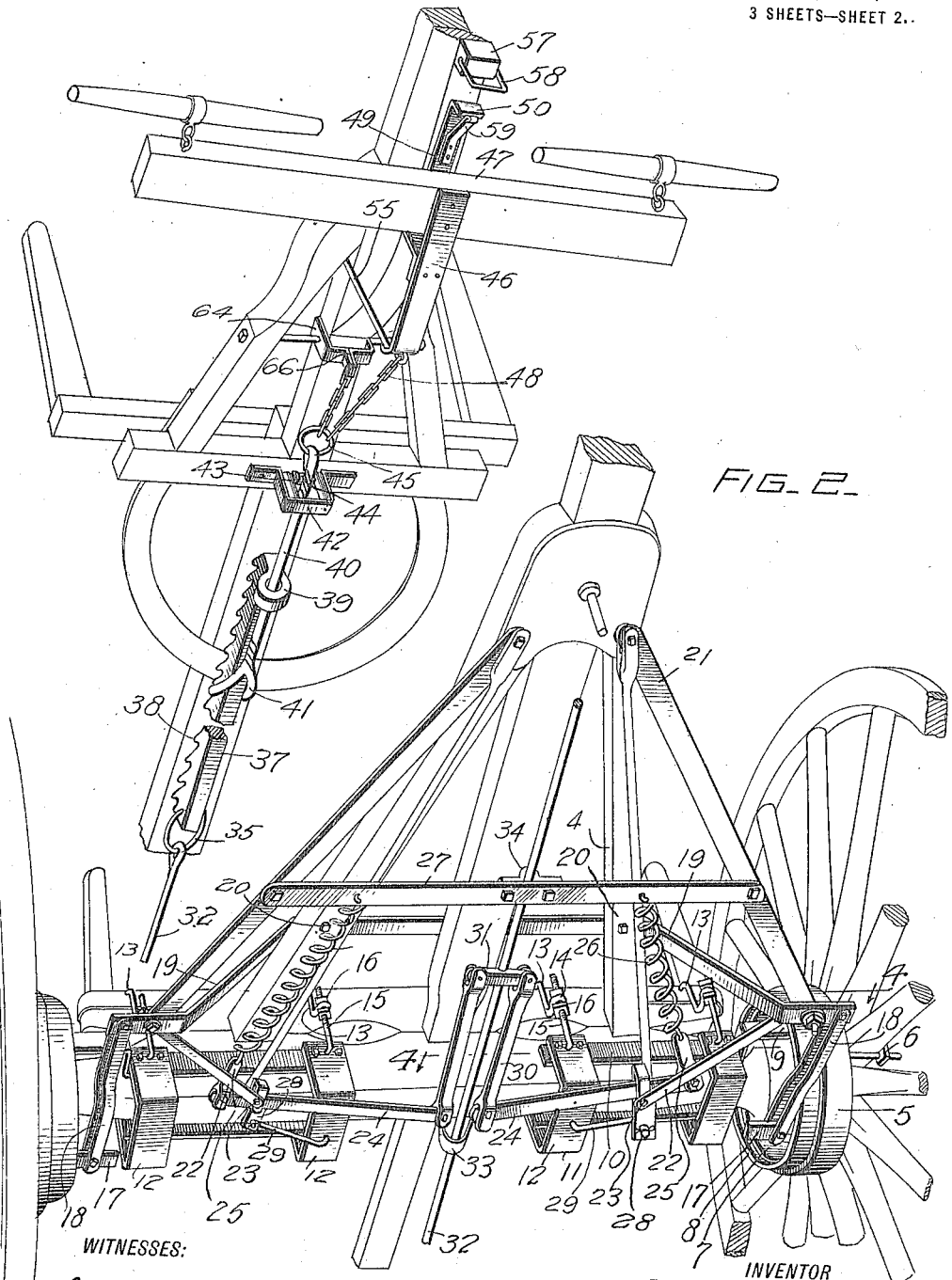

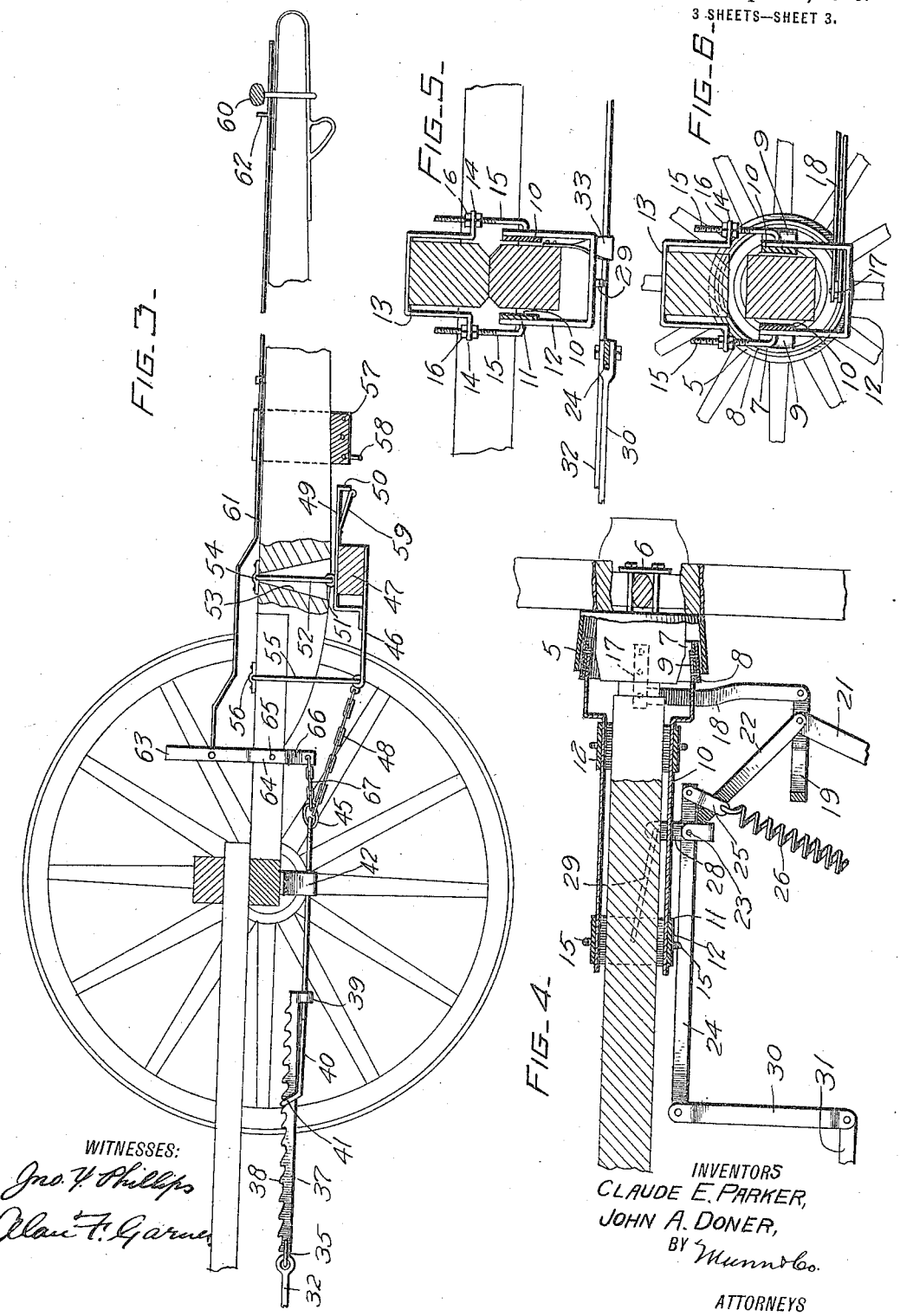

CLAUDE EARL PARKER AND JOHN ALVAH DONER, OF MEMPHIS, MISSOURI.

AUTOMATIC WAGON-BRAKE.

1,180,072.

Specification of Letters Patent.     Patented Apr. 18, 1916.

Application filed March 18, 1915. Serial No. 15,156.

*To all whom it may concern:*

Be it known that we, CLAUDE E. PARKER and JOHN A. DONER, citizens of the United States, and residents of Memphis, in the county of Scotland and State of Missouri, have invented a certain new and useful Improvement in Automatic Wagon-Brakes, of which the following is a specification.

This invention relates to an improvement in automatic wagon brakes, and one of the principal objects of the invention is the provision of a brake which automatically locks the wheels when the vehicle to which it is applied is stationary, and which automatically unlocks the wheels when the pull exerted by the draft animals is imparted to the vehicle in drawing the same along.

Another object of the invention is to provide a brake in the form of a clutch operating against the rear wheels of the vehicle, whereby to normally lock the same when the vehicle is at rest, means being provided and actuable automatically through the pull of the draft animals for unlocking the clutch upon either a forward or a backward pull of the animals.

Still another object of the invention is to provide a spring tensioned brake normally in locking position to prevent movement of the rear vehicle wheels, and adapted to be actuated through a suitable mechanism connected with the double trees and neck yoke in order to be thrown out of locking position upon a pull being imparted to the double trees either in forward direction or to the neckyoke in reverse direction.

A still further object is to provide a brake including laterally swinging carriages disposed adjacent the rear axle and carrying cone-shaped brake bands adapted normally to be actuated through the medium of springs whereby to engage the brake bands with other brake bands carried by the rear wheels, means being connected with the carriages and with the double tree in such manner that through the action or movement of the double tree, when a pull is imparted thereto by the draft animals, the carriages will be swung away from the wheels so as to withdraw the brake bands from their interlocking engagement so as to thus unlock the wheels and allow the vehicle to move forwardly or rearwardly as the case may be.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents a top plan view of a vehicle or wagon equipped with a brake constructed according to our invention; Fig. 2 represents a perspective view of the same, the view being taken from beneath the wagon; Fig. 3 represents a view in section taken longitudinally on the plane indicated by the line 3—3 of Fig. 1; Fig. 4 represents a view in section taken horizontally and longitudinally through the rear axle on the plane indicated by the line 4—4 of Fig. 2; Fig. 5 represents a view in section taken transversely on the plane indicated by the line 5—5 of Fig. 1, looking in the direction indicated by the arrows, and Fig. 6 represents a view in section taken transversely on the plane indicated by the line 6—6 of Fig. 1, looking in the direction indicated by the arrows.

In carrying out our invention, we provide each of the rear wheels of the vehicle to which the device is to be attached, with a cone-shaped outer brake band 5 surrounding the hub inside of the wheel, and connected with the spokes of the wheel in the manner indicated, through the medium of suitable clips 6. Adapted to coact with each of the outer brake bands, is an inner cone-shaped brake band 7 provided with a brake lining 8. The inner brake band may be shifted laterally toward or away from the outer brake band whereby to bind the brake lining between the bands in order that the wheels may be locked or unlocked.

Each brake band 7 is carried at the outer extremity 9 of a pair of side bars 10 of one of the carriages indicated generally at 11. Two of these carriages are provided, one for each of the inner brake bands, and they are disposed beneath the rear axle of the vehicle on opposite sides of the central line of the vehicle, as clearly indicated in Fig. 2. The side bars 10 of the carriages are connected near their ends by the yoke members 12 which are substantially U-shaped and straddle the lower part of the axle. The side bars 10 as shown extend longitudinally of the rear axle, and are disposed one on the forward and one on the rear side thereof. The carriage 11, carrying the inner brake band, is mounted so as to move longitudinally of the axle toward and away from the wheel. In order to accomplish this, we provide each of the carriages with a pair of inverted U-shaped yokes or swings 13 straddling the rear bolster and pivoted in cross grooves provided on the upper side of said bolster. The swings 13 at their lower ends are provided with offset eyes 14 through which bolts 15 carried by the yokes 12 pass and are adjustably connected by means of nuts 16.

In order to prevent any rotary motion of the inner brake band incident to the locking of the same with the rotating outer brake band, we provide said inner band with an arm 17 connected by means of a pair of links 18 with the outer end of a brace 19. The brace 19 spans the perch stays 4 and is connected at 20 to one of the perch stays and from the perch stays which form part of the coupling of the vehicle, the brace extends outwardly and downwardly and at its outer ends is disposed in a horizontal plane below the rear axle. The brace 19 is connected near its outer end to the coupling by means of a bar 21. This bar extends from the brace forwardly. A second bar or brace 22 connects the outer end of brace 19 with the rear axle, said bar 22 being connected to the axle by the means of a bolt 23. Bars 21 and 22 thus maintain brace 19 against movement, and in turn this brace secures the inner brake band against rotary movement. It will of course be understood that each of the brake bands is provided with the means just described for maintaining it against movement.

On each of the bolts 23 is pivoted near its outer end, a lever 24. Each of the levers 24 at its outer end is connected by means of a link 25 and spring 26 with a cross bar 27 secured to the bars 21 and which extends transversely of the wagon frame in advance of the rear axle. The tendency of the springs 26 is to pull the outer ends of lever 24 forwardly and hence pull the inner ends of those levers rearwardly. Adjacent the pivot point 23 each lever 24 is provided with a rearwardly extending arm 28. The arms 28 near their outer ends are connected by means of the links 29 with the yokes 12 at the inner ends of the carriages 11. Thus as the levers 24 oscillate on their pivots 23, the carriages are swung toward or away from the wheels on their swings, and since the tendency of the spring 26 is to carry the outer ends of the levers forwardly, the arms 28 are thus moved toward the wheel, and consequently the carriages are normally in a position such that the inner brake bands are in locking engagement with the outer brake bands, and the ground or rear wheels of the vehicle thus retained against rotary motion.

The inner ends of levers 24 are connected by means of links 30 with the opposite sides of a cross arm 31 secured upon a sliding rod 32. This rod at its rear end is supported in a brace or eye 33 secured to the rear axle and near its forward end slidably extends through a clip 34 secured to the cross bar 27. The rod 32 is connected at its forward end by means of a clevis 35 with a take-up mechanism 37 in the form of a rack bar having rearwardly projecting teeth 38 on its upper edge. This rack bar at its forward end is provided with a depending eye 39 through which a flexible element 40 extends. The flexible element has a loop or eye 41 at its rear end, which may be engaged upon the teeth of the rack bar in the manner indicated in Fig. 2, so as to provide for adjustment of the flexible element relatively to the take-up mechanism in the manner shown. A bridge 42 is secured beneath the front axle of the vehicle, and this bridge carries a pair of spaced vertical rollers 43 and a horizontal roller 44. Between these rollers the flexible element extends, and said element at its forward end is provided with a ring 45.

A plate 46 for supporting the double tree 47 is connected at its rear end to ring 45 through the medium of a chain or other suitable flexible element 48. This plate is provided with an upwardly offset strap or iron 49 which extends above the double tree and projects forwardly of the same. The strap 49 at its forward end is provided with a downwardly bent portion 50 in the form of a hook. An eye bolt 51 extends through the strap iron 49, double tree 47, and plate 46, and serves as a pivot for the double tree. This eye bolt is connected at its upper end to the lower end of a T-bolt 52. The latter is disposed within the cone-shaped opening 53 provided in the tongue of the wagon, and at its upper end is pivoted in bearings 54 carried by said tongue. In this manner the double tree when no pressure is exerted thereon, hangs free in the manner indicated in Fig. 3, and when said double tree is pulled forwardly, it moves through the medium of its suspension mechanism forwardly with regard to the tongue until the T-bolt 52 engages against the forward edge or end of the recess 53, at which time the forward movement of the double tree will be arrested. As it moves the double tree carries with it, of course, the plate 46 and strap or iron 49. A limited rearward movement of the double tree relatively to the tongue is also allowed by reason of the disposition of the cone-shaped opening. The rear end of plate 46 is swingingly supported from the tongue through the medium of an inverted U-shaped hanger 55 which straddles the tongue and which is carried by a clip or bearing 56 secured on top of said tongue.

A block 57 is secured beneath the tongue in advance of the strap 49, and this block has ring 58 depending therefrom. When it is desired that the double tree be maintained in forward position, the ring 58 is swung backwardly, and hook portion 50 of plate 49 is engaged within said ring. A spring 59 is carried beneath strap 49 and adapted to coact with hook 50 in such manner as to engage thereagainst when the hook is connected with the ring in order that accidental disengagement of the hook from the ring will be avoided.

Through the medium of the swinging double tree and the connection between this double tree and the levers 24, it will be seen that when a pull is imparted to the double tree by the draft animals, the same will be shifted forwardly relatively to the tongue and will swing the inner ends of links 24 forwardly against the tension of springs 26, and will thus through the medium of the connecting means between the links and the carriages 11, shift said carriages away from the hubs and disengage the inner brake bands from the outer ones. Thus upon a forward pull being imparted to the double tree when the wagon or vehicle is at a standstill, the brakes will be automatically disengaged, and will remain disengaged during the entire length or duration of that pull, and when the pull is relaxed the springs 26 will operate to again shift the brakes into locking position so as to automatically stop the vehicle.

In order that when it is desired to back the wagon, the pull of the draft animals imparted to the double tree will similarly disengage the brakes, I have provided a mechanism which is operable by the neck yoke 60 (see Fig. 3). This mechanism includes a sliding bar 61 slidably disposed upon the top of the tongue, and having an upwardly extending toe 62 at its forward end, and being connected at its rear end to the upper portion of a lever 63. This lever is provided with an eye 64 through which the tongue extends, and through the eye and tongue a pin 65 projects so that the lever is pivotally connected with the tongue. The lower end 66 of the lever is connected by means of a link or chain 67 with ring 45. When the draft animals are backed, the neck yoke 60 in moving backwardly with relation to the tongue, engages against the toe 62 and shifts the sliding bar rearwardly so as to throw the lowered end of lever 63 forwardly, thus imparting a forward pull to the train of elements connected to lever 24, and actuating the lever so as to unlock the brakes in the manner already described.

Normally the double tree will be free, that is it will be disconnected from the ring 58, so that while the animals are pulling the vehicle, the brake will be disconnected, and that when the pull ceases the brake will be automatically operated in such manner as to lock the rear wheels. The double tree will be connected with the ring 58 mainly only when it is desired to move the vehicle short distances by hand.

It will be seen that we have thus provided a brake which automatically operates to retard a movement of the vehicle while there is no draft applied to said vehicle, and also to automatically be released upon application of pull to the vehicle so as to unlock the wheels and allow forward or reverse movements of the vehicle in the ordinary manner.

Although we have described the preferred embodiment of our invention, we may desire to make such changes in the construction, combination, and arrangement of parts thereof as do not depart from the spirit of the invention and the scope of the appended claims.

We claim:—

1. A device of the class described comprising an outer brake band adapted to be secured to the wheel of a wagon, an inner brake band adapted to be moved toward and away from said outer brakeband for setting and releasing the brake, a carriage by which the inner brake band is carried, means for swingingly depending said carriage in such manner that the carriage may swing toward and away from the outer brake band, means for preventing rotary movement of the inner brakeband, a lever, connecting means between the lever and carriage whereby to shift said carriage toward the outer brake band when the lever is moved in one direction, and to shift the carriage away from the band when the lever is moved in the opposite direction, spring actuated means adapted to normally shift the carriage and inner brake band toward the outer brake band, means for swingingly supporting a double tree in such manner that the double tree may be moved relatively to the vehicle upon a pull being imparted thereto, connecting means between the double tree and lever whereby to shift the latter when said double tree is moved forwardly with relation to the vehicle, in order to move said carriage and brake band away from the outer brake band, and means operable by a neck yoke and adapted to operate the lever whereby to shift the inner brakeband away from the outer brake band when the neck yoke is moved backwardly relatively to the vehicle, upon backward movement of the draft animals.

2. A device of the class described comprising an outer brake element carried by a ground wheel of a vehicle, an inner brake element movable relatively to the outer brake, whereby to set or release the brakes, a carriage on which the inner brake element is carried, means for suspending said carriage in such manner that it may be moved for shifting the inner brake element into and out of set position, and means for operating said carriage, said carriage including a pair of side bars to which the inner brake element is connected, yokes connecting the side bars, a plurality of swings connected pivotally to the vehicle, and means connecting the yokes with the swings in such manner that such yokes may be adjusted relatively to the swings.

3. A device of the class described including a carriage, a brake operable by said carriage, means for suspending the carriage to a vehicle in such manner that the carriage may be moved into setting and releasing position, a lever, connecting means between said lever and carriage whereby the latter may be moved into setting and releasing positions upon movements of the lever in one direction and another, spring means connected with the lever for normally maintaining the carriage in set position, means for swingingly supporting a doubletree in such manner that the latter may be moved relatively to the vehicle, connecting means between said doubletree supporting means and the lever, whereby the lever may be actuated upon movement of the doubletree to shift the carriage into releasing position, means for maintaining the double tree in fixed relation with the vehicle at will, and means operable by the neck yoke for shifting the carriage into releasing position.

4. The combination with a vehicle, of a carriage swingingly depended therefrom, a brake operable by the carriage, said carriage being adapted to move into setting and releasing positions whereby to set and release the brake, a plate swingingly depended from the tongue of the vehicle, said plate adapted to support a double tree, a lever connected with the carriage and adapted to move the latter into setting and releasing positions, resilient means adapted to actuate the lever whereby to normally maintain the carriage in set position, a flexible connecting means between the plate and lever whereby to operate the latter when said doubletree is moved forwardly with regard to the vehicle, to shift the carriage into releasing position, and means connected with said lever and operable by the neck yoke when the latter is moved rearwardly, whereby to shift the carriage into releasing position.

5. A device of the class described including a brake, a movable carriage adapted to set and release the brake, spring means for normally maintaining the carriage in set position, a lever to which the spring means is connected at one end, an arm carried by said lever, a link connecting said arm and carriage, a sliding rod operable upon a pull being imparted to the doubletree of the vehicle, and connections between the sliding rod and lever whereby to actuate the latter when said rod is moved forwardly in order to shift the carriage into releasing position.

6. The combination with a vehicle, of a carriage swingingly depended therefrom and adapted to be moved into set and releasing position whereby to set and release a brake, means for normally maintaining the carriage in set position, a doubletree carrying mechanism swingingly depended from the vehicle, connecting means between the last said mechanism and the carriage for moving the latter into releasing position when a forward pull is imparted to the doubletree carrying mechanism, means for maintaining the doubletree carrying mechanism in forward position at will, and means operable by the neck yoke when the latter is shifted rearwardly whereby to shift the carriage into releasing position.

7. A device of the class described including a carriage adapted to be moved whereby to set and release a brake, said carriage normally being maintained in set position, a movable means for supporting a doubletree, connecting means between said doubletree supporting means and carriage whereby to move the latter into releasing position when the doubletree supporting means is moved forwardly, a sliding bar, a lever to which the sliding bar is connected, connecting means between the lever and carriage, said sliding bar adapted to be actuated by the neck yoke when the latter is shifted rearwardly whereby to move the carriage into releasing position.

8. The combination with a vehicle, of a brake movable into set and releasing positions, a double-tree swingingly suspended from the vehicle, a flexible connection between the double-tree and the brake whereby to release the latter when the doubletree is shifted forwardly relatively to the vehicle, a pivoted lever, a flexible connection independent of the first said connection arranged between the lever and the brake, and a rigid connection operable by the neck yoke and connected to the lever.

9. The combination with a vehicle, of a brake movable into set and releasing positions, means for normally maintaining the brake in set position, a double-tree movable relatively to the vehicle, connecting means between the double-tree and the brake adapted to move the brake into releasing position upon a forward pull being imparted to the double-tree and adapted to allow the brake to move into set position upon a rearward pull being imparted to the double-tree, a lever operable by the neck-yoke, and flexible connecting means between the lever and brake, independent of the first said connecting means, adapted to move the brake into releasing position upon rearward movement of the neckyoke and adapted to allow the brake to move into set position upon forward movement of said neckyoke.

10. The combination with a vehicle, of a brake movable into set and releasing positions, means for normally maintaining the brake in set position, a double-tree movable relatively to the vehicle, means operable by the double-tree adapted to move the brake into releasing position upon a forward pull being imparted to the double-tree and adapted to allow the brake to move into set position upon a rearward pull being imparted to the double-tree, and means operable by the neck yoke independently of the double-tree adapted to move the brake into releasing position upon rearward movement of the neck yoke and adapted to allow the brake to move into set position upon a forward movement of the neck yoke.

CLAUDE EARL PARKER.
JOHN ALVAH DONER.

Witnesses:
HERBERT F. NORRIS,
EDNA M. DOWDALL.

Copies of this patent may be obtained for five cents each, by addressing the "Commissioner of Patents, Washington, D. C."